United States Patent
Yang et al.

(10) Patent No.: US 10,976,800 B2
(45) Date of Patent: Apr. 13, 2021

(54) ELECTRONIC DEVICE CAPABLE OF REDUCING POWER CONSUMPTION AND METHOD FOR REDUCING POWER CONSUMPTION OF ELECTRONIC DEVICE

(71) Applicants: Huawei Technologies Co., Ltd., Shenzhen (CN); Fudan University, Shanghai (CN)

(72) Inventors: RenHua Yang, Shanghai (CN); Junfeng Zhao, Shenzhen (CN); Wei Yang, Hangzhou (CN); Shihai Xiao, Hangzhou (CN); Yinyin Lin, Shanghai (CN); Yi Wei, Shanghai (CN)

(73) Assignees: Huawei Technologies Co., Ltd., Shenzhen (CN); Fudan University, Shanghai (CN)

( * ) Notice: Subject to any disclaimer, the term of this patent is extended or adjusted under 35 U.S.C. 154(b) by 57 days.

(21) Appl. No.: 15/882,612

(22) Filed: Jan. 29, 2018

(65) Prior Publication Data
US 2018/0150128 A1 May 31, 2018

Related U.S. Application Data (63) Continuation of application No. PCT/CN2016/092335, filed on Jul. 29, 2016.

(30) Foreign Application Priority Data

Jul. 30, 2015 (CN) .......................... 201510460607.2

(51) Int. Cl.
*G06F 1/3287* (2019.01)
*G06F 3/06* (2006.01)
(Continued)

(52) U.S. Cl.
CPC .......... *G06F 1/3287* (2013.01); *G06F 1/3228* (2013.01); *G06F 1/3275* (2013.01);
(Continued)

(58) Field of Classification Search
CPC .............................. G06F 1/3287; G06F 1/3275
See application file for complete search history.

(56) References Cited

U.S. PATENT DOCUMENTS 7,779,243 B2 8/2010 Adrangi et al.
2005/0278559 A1* 12/2005 Sutardja ................ G06F 1/3203
713/320
(Continued)

FOREIGN PATENT DOCUMENTS

CN 1707400 A 12/2005
CN 101178690 A 5/2008
(Continued)

OTHER PUBLICATIONS

Juan et al., "Exploring memory energy optimizations in smartphones," IEEE 2011, Institute of Electrical and Electronics Engineers, New York, New York (2011).

*Primary Examiner* — Kim Huynh
*Assistant Examiner* — Joshua Neveln
(74) *Attorney, Agent, or Firm* — Leydig, Voit & Mayer, Ltd.

(57) ABSTRACT

An electronic device includes a processor, a volatile memory, and a non-volatile memory. The non-volatile memory stores a first operating system, and the electronic device works in a first working mode and a second working mode. When the electronic device is in the first working mode, a second operating system is run in the volatile memory. When the processor detects that the electronic device reaches a preset condition for entering the second working mode, the non-volatile memory is enabled, and
(Continued)

non-system data in the volatile memory is moved to the non-volatile memory. The non-system data does not include the second operating system. After the movement of the non-system data is completed, the volatile memory is disabled, and the first operating system is run in the non-volatile memory, so that the electronic device enters the second working mode.

11 Claims, 4 Drawing Sheets

(51) Int. Cl.
 *G06F 1/3228* (2019.01)
 *G06F 1/3234* (2019.01)
 *G06F 9/4401* (2018.01)
 *G06F 12/0868* (2016.01)

(52) U.S. Cl.
 CPC ............ *G06F 3/0604* (2013.01); *G06F 3/068* (2013.01); *G06F 3/0625* (2013.01); *G06F 3/0634* (2013.01); *G06F 3/0647* (2013.01); *G06F 3/0685* (2013.01); *G06F 9/4418* (2013.01); *G06F 12/0868* (2013.01); *Y02D 10/00* (2018.01)

(56) References Cited

U.S. PATENT DOCUMENTS

| | | | |
|---|---|---|---|
| 2006/0129757 A1* | 6/2006 | Scherzer | G06F 1/3203 711/113 |
| 2008/0222357 A1 | 9/2008 | Sutardja et al. | |
| 2010/0077244 A1 | 3/2010 | Nowak et al. | |
| 2014/0181558 A1 | 6/2014 | Taha et al. | |
| 2015/0178009 A1 | 6/2015 | Shin et al. | |
| 2016/0055031 A1* | 2/2016 | Tu | G06F 9/441 713/2 |
| 2016/0077930 A1* | 3/2016 | McKelvie | G06F 12/0246 714/19 |
| 2017/0177061 A1* | 6/2017 | Kumar | G06F 1/3287 |

FOREIGN PATENT DOCUMENTS

| | | |
|---|---|---|
| CN | 102160016 A | 8/2011 |
| CN | 103259924 A | 8/2013 |
| CN | 103810126 A | 5/2014 |
| CN | 104122977 A | 10/2014 |
| CN | 104156226 A | 11/2014 |
| CN | 104460935 A | 3/2015 |
| CN | 104572511 A | 4/2015 |
| CN | 104656870 A | 5/2015 |
| CN | 104731725 A | 6/2015 |

* cited by examiner

ELECTRONIC DEVICE CAPABLE OF REDUCING POWER CONSUMPTION AND METHOD FOR REDUCING POWER CONSUMPTION OF ELECTRONIC DEVICE

CROSS-REFERENCE TO RELATED APPLICATIONS

This application is a continuation of International Application No. PCT/CN2016/092335, filed on Jul. 29, 2016, which claims priority to Chinese Patent Application No. 201510460607.2, filed on Jul. 30, 2015. The disclosures of the aforementioned applications are hereby incorporated by reference in their entireties.

STATEMENT OF JOINT RESEARCH AGREEMENT

The subject matter and the claimed application were made by or on the behalf of Huawei Technologies Co., Ltd., of Shenzhen, Guangdong Province, P.R. China and Fudan University, of Handan Road, Shanghai, P.R. China, under a joint research agreement titled "Hybrid Memory Methodology Technology Research Project". The joint research agreement was in effect on or before the claimed application was made, and that the claimed application was made as a result of activities undertaken within the scope of the joint research agreement.

TECHNICAL FIELD

The present application relates to the field of power consumption management technologies, and in particular, to an electronic device capable of reducing power consumption and a method for reducing power consumption of an electronic device.

BACKGROUND

In a portable mobile device such as a tablet computer or a mobile phone, power consumption of a memory accounts for approximately one-third of power consumption of the entire mobile device. As a memory capacity increases, the percentage of the power consumption of the memory in the power consumption of the entire mobile device becomes larger. Therefore, the power consumption of the memory may be reduced to prolong a standby time of the mobile device.

A dynamic random access memory (DRAM) has a relatively high access speed, and is usually used as a memory of a mobile device. In the DRAM, each memory cell includes one metal-oxide-semiconductor (MOS) transistor and one capacitor. An external power source supplies power to each memory cell, to store data. Because an electric charge stored in the capacitor leaks through the MOS transistor after a period of time, a circuit needs to be refreshed periodically to supplement the capacitor with charges, so as to maintain the data stored in the cell.

Generally, the DRAM refreshes the circuit by using an external clock. In this way, a refreshing speed is relatively fast, but more power is consumed. In the prior art, to reduce power consumption, after an electronic device enters a low power consumption state such as a black-screen standby state, the DRAM may enter a self-refreshing state. That is, the DRAM refreshes the circuit by using a clock of the DRAM, instead of using an external clock. Therefore, power consumption of the electronic device in a low power consumption state may be further reduced.

However, during self-refreshing, the DRAM still needs to refresh all memory banks. Consequently, the power consumption of the electronic device is still high in the low power consumption state.

SUMMARY

Embodiments of the present application provide an electronic device capable of reducing power consumption and a method for reducing power consumption of an electronic device, so as to reduce power consumption of an electronic device.

A first aspect of the present application provides an electronic device capable of reducing power consumption, including a processor, a volatile memory, and a non-volatile memory, where the non-volatile memory stores a first operating system, and the electronic device works in a first working mode and a second working mode;

when the electronic device is in the first working mode, a second operating system is run in the volatile memory; when the processor detects that the electronic device reaches a preset condition for entering the second working mode, the non-volatile memory is enabled, and non-system data in the volatile memory is moved to the non-volatile memory, where the non-system data does not include the second operating system; and after the movement of the non-system data is completed, the volatile memory is disabled, and the first operating system is run in the non-volatile memory, so that the electronic device enters the second working mode.

With reference to the first aspect, in a first possible implementation, when the electronic device is in the second working mode and the processor detects that the electronic device reaches a preset condition for entering the first working mode, the volatile memory is enabled, the second operating system is loaded to the volatile memory, and non-system data in the non-volatile memory is moved to the volatile memory, where the non-system data in the non-volatile memory does not include the first operating system; after the movement of the non-system data in the non-volatile memory is completed, the non-volatile memory is disabled; and after the loading of the second operating system is completed, the second operating system is run in the volatile memory, so that the electronic device enters the first working mode.

With reference to the first aspect or the first possible implementation, in a second possible implementation, the moved non-system data in the volatile memory is valid data.

With reference to the first aspect, the first possible implementation, or the second possible implementation, in a third possible implementation, the processor includes a first processor and a second processor, the processor is the first processor when the electronic device is in the first working mode, and the processor is the second processor when the electronic device is in the second working mode, where a frequency of the second processor is lower than a frequency of the first processor.

With reference to the first aspect or any one of the foregoing possible implementations, after detecting that the electronic device reaches the condition for entering the second working mode, the processor further calculates a data volume of the non-system data in the volatile memory and determines whether the data volume of the non-system data in the volatile memory is not greater than a preset data volume threshold; and if the data volume is not greater than the preset data volume threshold, the non-system data in the volatile memory is moved to the non-volatile memory; or if the data volume is greater than the preset data volume threshold, maintains the electronic device in the first working mode, or moves a part of the non-system data in the volatile memory that is equal to the data volume threshold to the non-volatile memory and stores a remaining part to an external memory of the electronic device.

A second aspect of the present application provides a method for reducing power consumption of an electronic device, where the electronic device includes a volatile memory and a non-volatile memory, the non-volatile memory stores a first operating system, and the electronic device works in a first working mode and a second working mode;

when the electronic device is in the first working mode, the second operating system is run in the volatile memory, and it is detected whether the electronic device reaches a condition for entering the second working mode;

the non-volatile memory is enabled if the electronic device reaches the condition for entering the second working mode;

non-system data in the volatile memory is moved to the non-volatile memory, where the non-system data does not include the second operating system; and after the movement of the non-system data is completed, the volatile memory is disabled, and the second operating system is run in the non-volatile memory, so that the electronic device enters the second working mode.

With reference to the second aspect, in a first possible implementation, when the electronic device is in the second working mode, it is detected whether the electronic device reaches a preset condition for entering the first working mode;

if the electronic device reaches the preset condition for entering the first working mode, the volatile memory is enabled, the first operating system is loaded to the volatile memory, and non-system data in the non-volatile memory is moved to the volatile memory; and after the loading of the first operating system is completed, the second operating system is run in the volatile memory, so that the electronic device enters the first working mode.

With reference to the second aspect or the first possible implementation, in a second possible implementation, the moved non-system data in the volatile memory is valid data.

With reference to the second aspect, the first possible implementation, or the second possible implementation, in a third possible implementation, the moving non-system data in the volatile memory to the non-volatile memory includes:
calculating a data volume of the non-system data in the volatile memory;
determining whether the data volume of the non-system data in the volatile memory is not greater than a preset data volume threshold; and
if the data volume is not greater than the preset data volume threshold, moving the non-system data in the volatile memory to the non-volatile memory; or
if the data volume is greater than the preset data volume threshold, maintaining the electronic device in the first working mode, or moving a part of the non-system data in the volatile memory that is equal to the data volume threshold to the non-volatile memory and storing a remaining part to an external memory of the electronic device.

It can be seen that in the electronic device capable of reducing power consumption and the method for reducing power consumption of an electronic device that are provided in the embodiments of the present application, a non-volatile memory is added, and an operating system is set in the non-volatile memory; when the electronic device enters a low power consumption working mode, non-system data in a volatile memory is moved to the non-volatile memory, and then the volatile memory is disabled, so that the non-volatile memory is used as a memory of the electronic device to perform a corresponding operation. In this way, after the volatile memory is disabled, self-refreshing does not need to be performed to save data, thereby reducing power consumption of the electronic device.

BRIEF DESCRIPTION OF DRAWINGS

To describe the technical solutions in the embodiments of the present application more clearly, the following briefly describes the accompanying drawings required for describing the embodiments or the prior art.

DESCRIPTION OF EMBODIMENTS

The following clearly describes the technical solutions in the embodiments of the present application with reference to the accompanying drawings in the embodiments of the present application.

Figure 1:
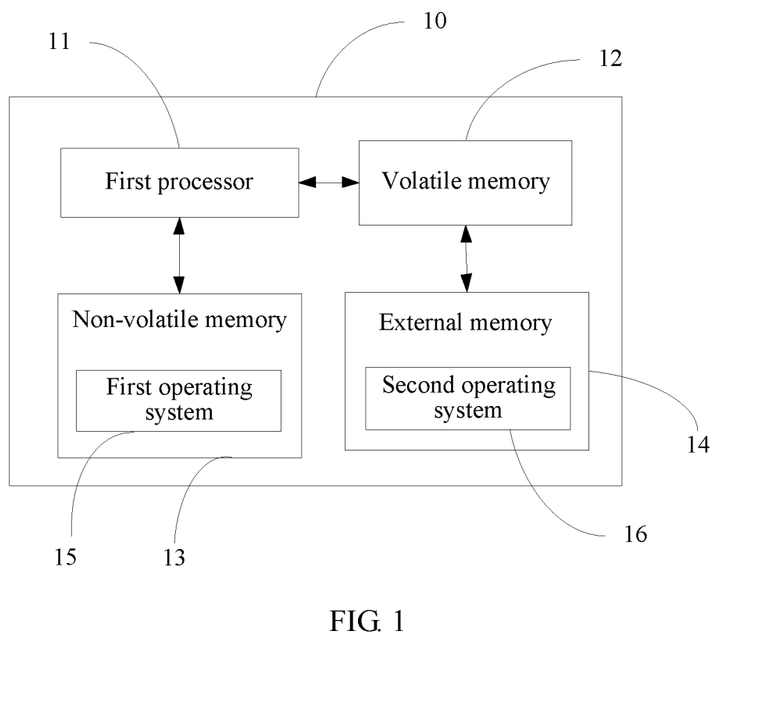
FIG. 1 is a structural diagram of an electronic device capable of reducing power consumption according to an embodiment of the present application.

As shown in FIG. 1, FIG. 1 is a structural diagram of an electronic device capable of reducing power consumption according to an embodiment of the present application. The electronic device 10 includes a first processor 11, a volatile memory 12, a non-volatile memory 13, and an external memory 14. The non-volatile memory 13 stores a first operating system 15, and the external memory 14 stores a second operating system 16. The electronic device 10 may work in two working modes, that is, a first working mode and a second working mode. When the electronic device 10 is in the first working mode, the volatile memory 12 is enabled, the non-volatile memory 13 is disabled, and the second operating system 16 is loaded to and run in the volatile memory 12. When the electronic device 10 is in the second working mode, the non-volatile memory 13 is enabled, and the volatile memory 12 is disabled.

In this embodiment, the electronic device 10 is a portable mobile device, such as a tablet computer or a mobile phone. The volatile memory 12 is a dynamic random access memory (DRAM), which has a relatively high access speed, but consumes more power. The non-volatile memory 13 is a phase change memory PCM), which consumes less power, but has a low access speed. Therefore, power consumption is lower when the electronic device 10 is in the second working mode.

The external memory 14 is an NAND memory configured to store the second operating system 16 and other data. When the electronic device 10 is running, data in the external memory 14 may be transferred to the volatile memory 12 to be processed by the first processor 11.

Switching between the first working mode and the second working mode is described in detail below.

Figure 2:
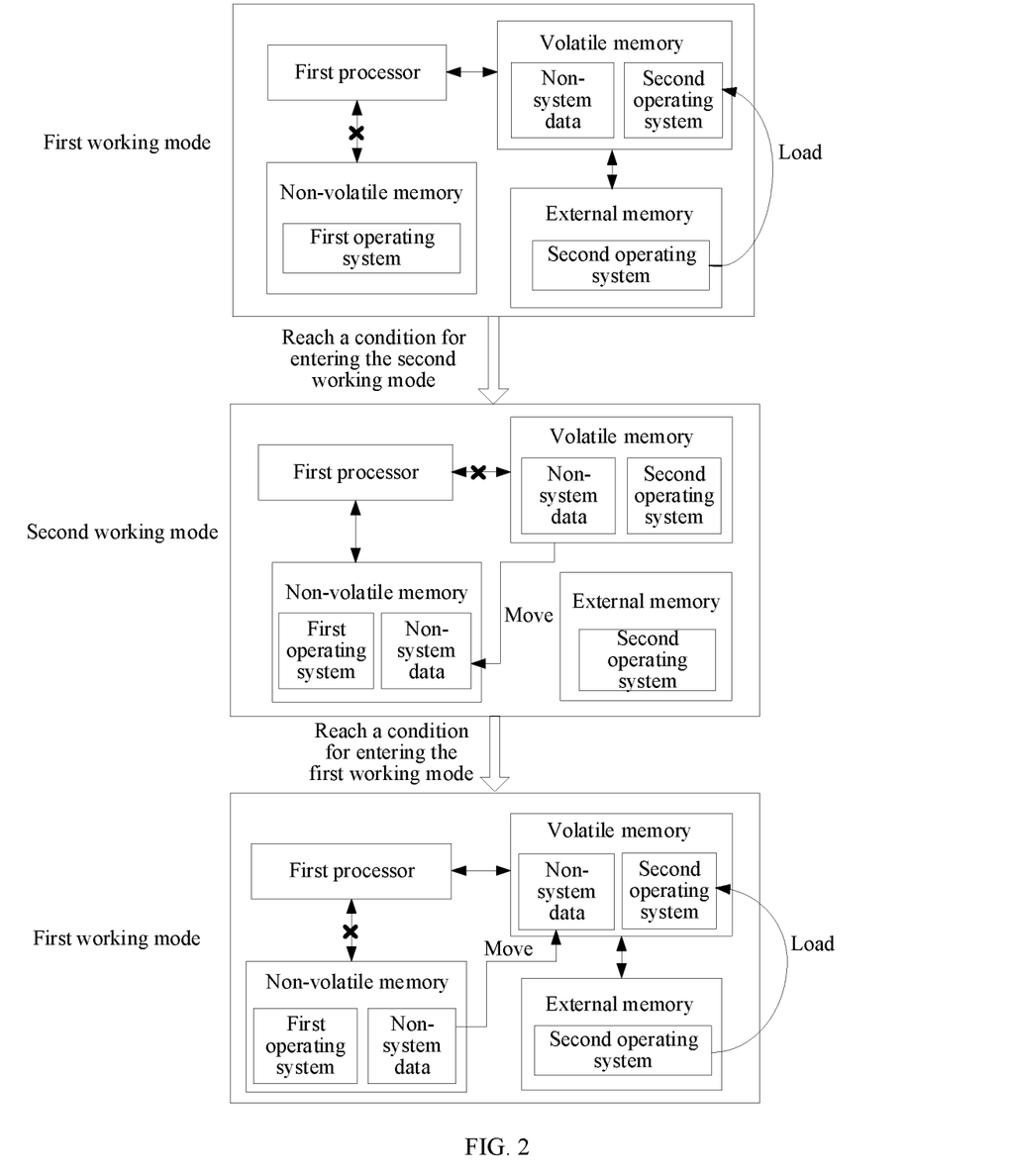
FIG. 2 is a schematic diagram of a process in which the electronic device in FIG. 1 performs working mode switching.

As shown in FIG. 2, when the electronic device 10 is in the first working mode, the second operating system 16 is run in the volatile memory 12. When the first processor 11 detects that the electronic device 10 reaches a preset condition for entering the second working mode, the non-volatile memory 13 is enabled, and non-system data in the volatile memory 12 is moved to the non-volatile memory 13. The non-system data does not include the second operating system 16. After the movement of the non-system data is completed, the volatile memory 12 is disabled, and the first operating system 15 is run in the non-volatile memory 13, so that the electronic device 10 enters the second working mode.

When the electronic device 10 is in the second working mode and the first processor 11 detects that the electronic device 10 reaches a preset condition for entering the first working mode, the volatile memory 12 is enabled, the second operating system 16 is loaded to the volatile memory 12, and non-system data in the non-volatile memory 13 is moved to the volatile memory 12. The non-system data in the non-volatile memory 13 does not include the first operating system 15. After the movement of the non-system data in the non-volatile memory 13 is completed, the non-volatile memory 13 is disabled. After the loading of the second operating system 16 is completed, the second operating system 16 is run in the volatile memory 12, so that the electronic device 10 enters the first working mode.

The moved non-system data in the volatile memory 12 is valid data, that is, data marked as valid in the volatile memory 12.

The first operating system 15 is a system consuming less power and occupying little memory space, for example, a Symbian system or a compact version operating system obtained after removing some functions from the second operating system 16, and is capable of performing basic functions such as making a call, sending a short message service message, and managing a background file.

The condition for entering the second working mode may be that the first processor 11 receives a request of entering the second working mode that is generated by an input unit (not shown) in response to an operation of a user. That is, the user may manually set the electronic device to the second working mode. Correspondingly, the condition for entering the first working mode may be that the first processor 11 receives a request of entering the first working mode that is generated by the input unit in response to an operation of a user. That is, the user may manually set the electronic device to the first working mode.

The condition for entering the second working mode may be that the first processor 11 detects that power consumption of the electronic device 10 within a unit time is less than a power consumption threshold. That is, the first processor 11 detects power consumption of the electronic device 10 in real time, and compares the detected power consumption with the power consumption threshold. When the power consumption of the electronic device 10 is less than the power consumption threshold, it indicates that the electronic device 10 may be in a black-screen standby state or may be running a low power consumption application. In this case, the electronic device 10 may be switched to the second working mode, so as to reduce power consumption. Correspondingly, the condition for entering the first working mode may be that the first processor 11 detects that power consumption of the electronic device 10 within a unit time is greater than the power consumption threshold. That is, the first processor 11 detects the power consumption of the electronic device 10 in real time, and compares the detected power consumption with the power consumption threshold. When the power consumption of the electronic device 10 is greater than the power consumption threshold, it indicates that the electronic device 10 may be running a high power consumption application. In this case, the electronic device 10 may be switched to the first working mode, so as to quickly respond to the high power consumption application.

The condition for entering the second working mode may be that the first processor 11 detects that an access frequency of data in the volatile memory 12 is less than a frequency threshold. That is, the first processor 11 detects the access frequency of the data in the volatile memory 12 in real time. If the detected access frequency of the data in the volatile memory 12 is less than the frequency threshold, it indicates that the electronic device 10 is in a relatively idle state. In this case, the electronic device 10 may be switched to the second working mode, so as to reduce power consumption. Correspondingly, the condition for entering the first working mode may be that the first processor 11 detects that an access frequency of data in the non-volatile memory 13 is greater than the frequency threshold. That is, the first processor 11 detects the access frequency of the data in the non-volatile memory 13 in real time. If the detected access frequency of the data in the non-volatile memory 13 is greater than the frequency threshold, it indicates that the electronic device 10 is in a relatively busy state. In this case, the electronic device 10 may be switched to the first working mode, so as to quickly respond to an operation request.

The condition for entering the second working mode may be that the first processor 11 detects that a current battery level of the electronic device 10 is less than a battery level threshold. That is, the first processor 11 detects the current battery level of the electronic device 10 in real time. If the detected current battery level of the electronic device 10 is less than the battery level threshold, it indicates that the battery level of the electronic device 10 is already relatively low. In this case, to reduce the power consumption and prolong a standby time of the electronic device 10, the electronic device 10 may be switched to the second working mode. Correspondingly, the condition for entering the first working mode may be that the first processor 11 detects that the current battery level of the electronic device is greater than the battery level threshold. That is, the first processor 11 detects the current battery level of the electronic device 10 in real time. If the detected current battery level of the electronic device 10 is greater than the battery level threshold, it indicates that the battery level of the electronic device 10 is already relatively high and is sufficient for performing any operation. In this case, the electronic device 10 may be switched to the first working mode.

Various conditions for the electronic device 10 to enter the second working mode and the first working mode are described above by using examples. Working mode switching manners corresponding to these conditions may all be set in one electronic device, so that a user may select a mode switching manner according to a personal usage habit. At least one mode switching manner may be selected according to a requirement. The foregoing merely describes, by using examples, switching conditions for the two modes, and the switching conditions for the two modes are not limited to the conditions listed above. Other conditions for switching between the two working modes that are set according to practical applications also fall within the scope disclosed in the present application.

After detecting that the electronic device 10 reaches the condition for entering the second working mode, the first processor 11 further calculates a volume of data needing to be moved, and then determines whether the volume of the data needing to be moved is not greater than a data volume threshold. The data volume threshold is a capacity of the non-volatile memory 13, or may be a value that is less than the capacity of the non-volatile memory 13 and that is set by a user according to a practical application. If the volume of the data needing to be moved is not greater than the data volume threshold, data in the volatile memory 12 is moved to the non-volatile memory 13. If the volume of the data needing to be moved is greater than the data volume threshold, the electronic device 10 is maintained in the first working mode, or a part of the data needing to be moved that is equal to the data volume threshold is moved to the non-volatile memory 13, and an excess part is stored to the external memory 14.

If the data needing to be moved is larger than the data volume threshold, it indicates that the electronic device 10 is currently in a low power consumption state, but there is still an active application occupying memory. In this case, in one method, working mode switching is not directly performed, that is, the electronic device 10 is still maintained in the first working mode, and mode switching is not performed until a user stops a corresponding application to release some memory space so that the volume of the data needing to be moved is less than the data volume threshold. Another method is to store an excess part to the external memory 14, and then perform working mode switching.

In this embodiment, when the non-system data in the volatile memory 12 is moved to the non-volatile memory 13, a mapping relationship between a storage address of the non-system data in the volatile memory 12 and a storage address of the non-system data in the non-volatile memory 13 is recorded. In this way, when data access occurs, corresponding data can be found from the non-volatile memory 13 according to the recorded mapping relationship between the addresses.

In this embodiment, the non-volatile memory 13 with relatively low power consumption is disposed in the electronic device 10, so that when the electronic device 10 does not need to execute an operation request with high performance, the volatile memory 12 with relatively high power consumption may be disabled, and the first operating system runs in the non-volatile memory 13 with relatively low power consumption, thereby effectively reducing power consumption.

Figure 3:
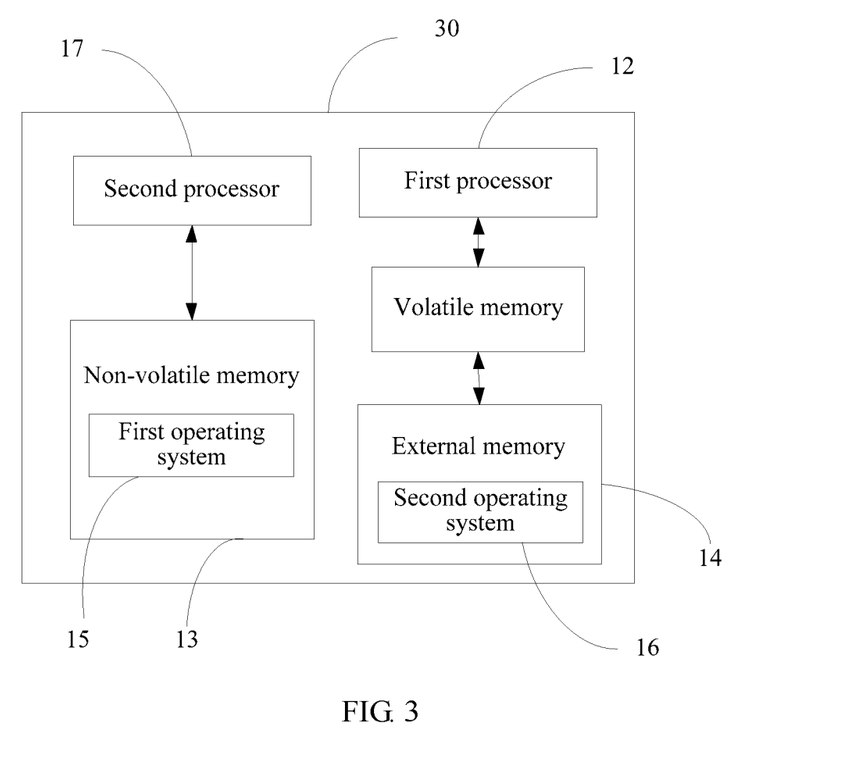
FIG. 3 is a structural diagram of another electronic device capable of reducing power consumption according to an embodiment of the present application.

As shown in FIG. 3, FIG. 3 is a structural diagram of another electronic device 30 capable of reducing power consumption according to an embodiment of the present application. A structure of the electronic device 30 provided in this embodiment is similar to the structure of the electronic device 10 provided in the foregoing embodiment. A difference between the two lies in that the electronic device 30 further includes a second processor 17, a frequency of the second processor 17 is lower than that of the first processor 11, and when the electronic device 30 is in the second working mode, the second processor 17 controls, by means of the first operating system 15, access to data in the non-volatile memory 13. During switching between the first working mode and the second working mode, when the electronic device 30 is in the first working mode, if the first processor 11 detects that the electronic device 30 reaches the condition for entering the second working mode, the non-system data is moved to the non-volatile memory 13. After the movement of the non-system data is completed, the volatile memory 12 and the first processor 11 are disabled, and the second processor 17 is started to run the first operating system 15, so as to enter the second working mode. When the electronic device 10 is in the second working mode, if the first processor 11 detects that the electronic device 30 reaches the condition for entering the first working mode, the volatile memory 12 is enabled, the second operating system 16 is loaded from the external memory 14 to the volatile memory 12, and non-system data in the non-volatile memory 13 is moved to the volatile memory 12. After the loading of the second operating system 16 is completed and the movement of the non-system data is completed, the non-volatile memory 13 and the second processor 17 are disabled, and the first processor 11 is started to run the second operating system 16, so that the electronic device 30 enters the first working mode.

In this embodiment, after the electronic device 30 enters the second working mode, the high-frequency first processor 11 is disabled, and the low-frequency second processor 17 is used, thereby further reducing power consumption.

Figure 4:
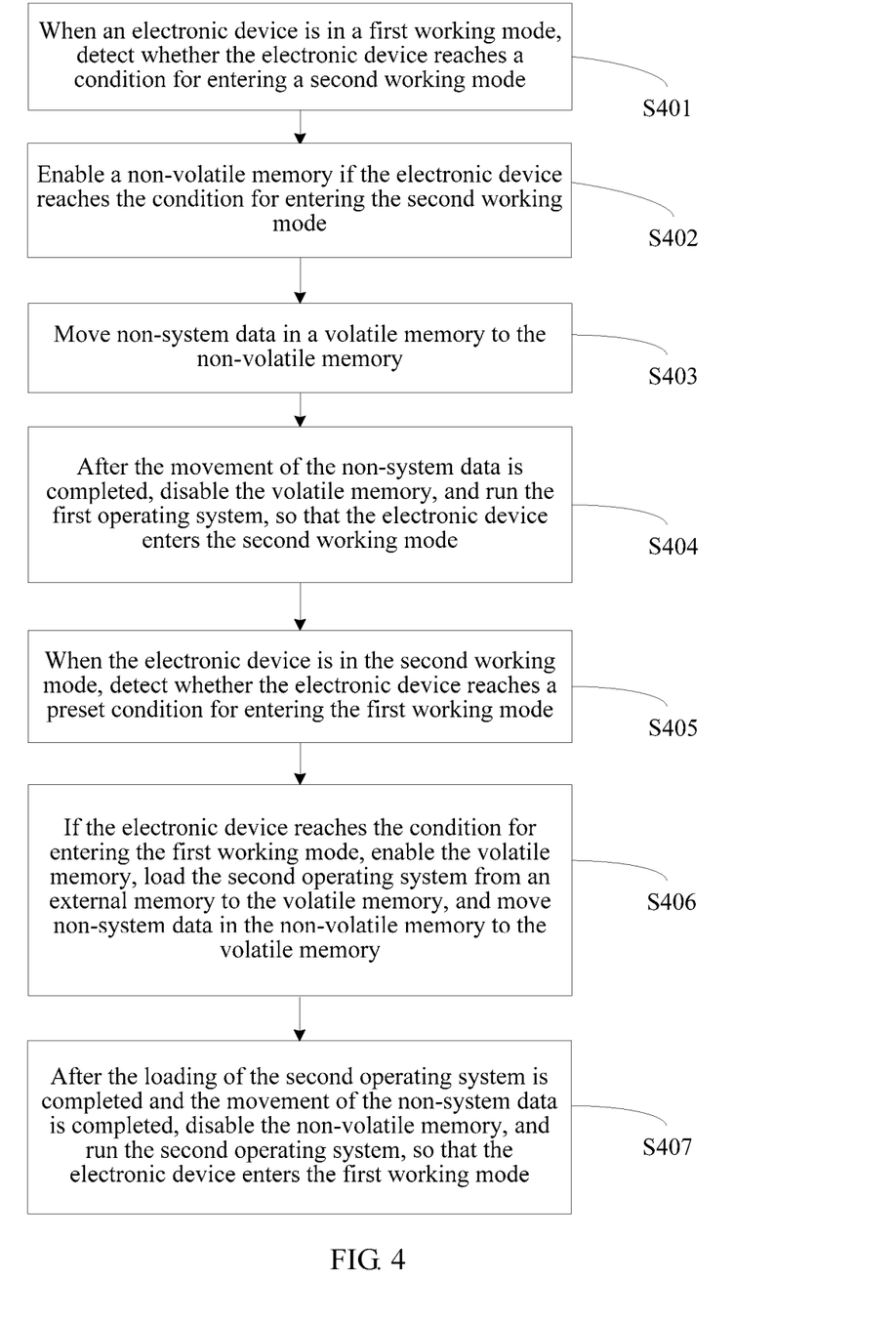
FIG. 4 is a flowchart of a method for reducing power consumption of an electronic device according to an embodiment of the present application.

As shown in FIG. 4, an embodiment of the present application further provides a method for reducing power consumption of an electronic device. The electronic device includes a volatile memory, a non-volatile memory, and an external memory. The external memory stores a second operating system. The non-volatile memory stores a first operating system. The electronic device has a first working mode and a second working mode. When the electronic device is in the first working mode, the volatile memory is enabled, the non-volatile memory is disabled, and the second operating system is loaded to and run in the volatile memory. When the electronic device is in the second working mode, the non-volatile memory is enabled, the volatile memory is disabled, and the first operating system is run in the non-volatile memory.

The method includes the following steps:

Step S401. When the electronic device is in the first working mode, detect whether the electronic device reaches a condition for entering the second working mode.

Step S402. Enable the non-volatile memory if the electronic device reaches the condition for entering the second working mode.

Step S403. Move non-system data in the volatile memory to the non-volatile memory, where the non-system data is data marked as valid in the volatile memory.

Step S404. After the movement of the non-system data is completed, disable the volatile memory, and run the first operating system, so that the electronic device enters the second working mode.

Step S405. When the electronic device is in the second working mode, detect whether the electronic device reaches a preset condition for entering the first working mode.

Step S406. If the electronic device reaches the condition for entering the first working mode, enable the volatile memory, load the second operating system from the external memory to the volatile memory, and move non-system data in the non-volatile memory to the volatile memory.

Step S407. After the loading of the second operating system is completed and the movement of the non-system data is completed, disable the non-volatile memory, and run the second operating system, so that the electronic device enters the first working mode.

In this embodiment, the condition for entering the second working mode and the condition for entering the first working mode are same as those described above, and details are not described herein again.

Before step S403, the method further includes: determining whether a data volume of the non-system data is not greater than a data volume threshold. The data volume threshold is a capacity of the non-volatile memory, or may be a value that is less than the capacity of the non-volatile memory and that is set by a user according to a practical application. If the data volume of the non-system data is not greater than the data volume threshold, the non-system data in the volatile memory is moved to the non-volatile memory. If the data volume of the non-system data is greater than the data volume threshold, the electronic device is maintained in the first working mode, or a part of the non-system data needing to be moved that is equal to the data volume threshold is moved to the non-volatile memory, and an excess part is stored to the external memory.

A person of ordinary skill in the art may understand that all or a part of the steps of the methods in the embodiments may be implemented by a program instructing relevant hardware. The program may be stored in a computer readable storage medium. The storage medium may include: a ROM, a RAM, a magnetic disk, or an optical disc.

The service processing method, system and device provided in the embodiments of the present application are described in detail above. The principle and implementation of the present application are described herein through specific examples. The description about the embodiments of the present application is merely provided to help understand the method and core ideas of the present application. In addition, a person of ordinary skill in the art can make variations and modifications to the present application in terms of the specific implementations and application scopes according to the ideas of the present application. Therefore, the content of specification shall not be construed as a limit to the present application.

What is claimed is:

1. An electronic device capable of reducing power consumption, comprising: a first processor, a second processor, an external memory, a volatile memory, and a non-volatile memory, wherein:
the first processor only runs in a first working mode and only controls, by means of a second operating system, access to the volatile memory;
the second processor only runs in a second working mode and only controls, by means of a first operating system, access to the non-volatile memory;
the non-volatile memory stores the first operating system;
the external memory stores the second operating system;
when the electronic device is in the first working mode, the first processor runs the second operating system from the volatile memory, wherein the second operating system is loaded from an external memory of the electronic device, and wherein the non-volatile memory and the second processor are disabled;
when the first processor detects that the electronic device reaches a preset condition for entering the second working mode, the non-volatile memory is enabled, and non-system data in the volatile memory is selectively moved to the non-volatile memory, wherein the non-system data does not comprise the second operating system;
after the movement of the non-system data is completed, the first processor and the volatile memory are disabled, and the first operating system is run from the non-volatile memory by the second processor, so that the electronic device enters the second working mode; and the preset condition is a frequency of data access threshold in real time, wherein in response to data being accessed at a frequency less than the frequency of data access threshold, the electronic device switches to the second working mode, and in response to the data being accessed at a frequency greater than the frequency of data access threshold, the electronic device switches to the first working mode.

2. The electronic device according to claim 1, wherein:
when the electronic device is in the second working mode and the processor detects that the electronic device reaches a preset condition for entering the first working mode, the volatile memory is enabled, the second operating system is loaded to the volatile memory, and non-system data in the non-volatile memory is moved to the volatile memory, wherein the non-system data in the non-volatile memory does not comprise the first operating system; and
after the loading of the second operating system is completed, the second operating system is run from the volatile memory, so that the electronic device enters the first working mode.

3. The electronic device according to claim 1, wherein the moved non-system data in the volatile memory is valid data.

4. The electronic device according to claim 1, wherein a frequency of the second processor is lower than a frequency of the first processor.

5. The electronic device according to claim 1, wherein:
after detecting that the electronic device reaches the condition for entering the second working mode, the processor further calculates a data volume of the non-system data in the volatile memory and determines whether the data volume of the non-system data in the volatile memory is not greater than a preset data volume threshold; and
if the data volume is not greater than the preset data volume threshold, the first processor moves the non-system data in the volatile memory to the non-volatile memory; or
if the data volume is greater than the preset data volume threshold, the first processor maintains the electronic device in the first working mode, or moves a part of the non-system data in the volatile memory that is equal to the data volume threshold to the non-volatile memory and stores a remaining part to the external memory of the electronic device.

6. The electronic device according to claim 1, wherein the non-system data is data marked as valid in the volatile memory.

7. The electronic device according to claim 1, wherein the non-system data is a subset of a total amount of data stored in the volatile memory.

8. A method for reducing power consumption of an electronic device, wherein the electronic device comprises a first processor, a second processor, an external memory, a volatile memory and a non-volatile memory, the non-volatile memory stores a first operating system, the external memory stores a second operating system, and the electronic device works in a first working mode and a second working mode, the method comprises:
running, only by the first processor, the first working mode, wherein, by means of the second operating system, the first processor only controls access to the volatile memory, and wherein the non-volatile memory and the second processor are disabled;
detecting whether the electronic device reaches a preset condition for entering the second working mode;

enabling the second processor and the non-volatile memory if the electronic device reaches the condition for entering the second working mode;

selectively moving non-system data in the volatile memory to the non-volatile memory, wherein the non-system data does not comprise the second operating system; and disabling the first processor and the volatile memory, and running, only by the second processor, the second working mode, wherein, by means of the first operating system, the second processor only controls access to the non-volatile memory, wherein the preset condition is a frequency of data access threshold in real time, wherein in response to data being accessed at a frequency less than the frequency of data access threshold, the electronic device switches to the second working mode, and in response to the data being accessed at a frequency greater than the frequency of data access threshold, the electronic device switches to the first working mode.

9. The method for reducing power consumption of an electronic device according to claim 8, further comprising:

detecting whether the electronic device reaches a preset condition for entering the first working mode when the electronic device is in the second working mode;

if the electronic device reaches the preset condition for entering the first working mode, enabling the first processor and the volatile memory, loading the second operating system to the volatile memory, and moving non-system data in the non-volatile memory to the volatile memory; and running the second operating system from the volatile memory, so that the electronic device enters the first working mode.

10. The method for reducing power consumption of an electronic device according to claim 8, wherein the moved non-system data in the volatile memory is valid data.

11. The method for reducing power consumption of an electronic device according to claim 8, wherein the moving the non-system data in the volatile memory to the non-volatile memory comprises:

calculating a data volume of the non-system data in the volatile memory;

determining whether the data volume of the non-system data in the volatile memory is not greater than a preset data volume threshold; and if the data volume is not greater than the preset data volume threshold, moving the non-system data in the volatile memory to the non-volatile memory; or if the data volume is greater than the preset data volume threshold, maintaining the electronic device in the first working mode, or moving a part of the non-system data in the volatile memory that is equal to the data volume threshold to the non-volatile memory and storing a remaining part to the external memory of the electronic device.

* * * * *

UNITED STATES PATENT AND TRADEMARK OFFICE
CERTIFICATE OF CORRECTION

PATENT NO. : 10,976,800 B2
APPLICATION NO. : 15/882612
DATED : April 13, 2021
INVENTOR(S) : Yang et al.

It is certified that error appears in the above-identified patent and that said Letters Patent is hereby corrected as shown below:

On the Title Page

Item (56), Other Publications, Citation 1: "Juan et al." should read -- Duan et al. --.

Signed and Sealed this
Tenth Day of May, 2022

Katherine Kelly Vidal
*Director of the United States Patent and Trademark Office*